United States Patent
Seki et al.

(10) Patent No.: US 10,054,162 B2
(45) Date of Patent: Aug. 21, 2018

(54) SLIDING BEARING

(71) Applicant: TAIHO KOGYO Co., Ltd., Toyota-shi, Aichi (JP)

(72) Inventors: Daisuke Seki, Toyota (JP); Yuji Takagi, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 0 days.

(21) Appl. No.: 15/553,814

(22) PCT Filed: Feb. 26, 2016

(86) PCT No.: PCT/JP2016/055950
§ 371 (c)(1),
(2) Date: Aug. 25, 2017

(87) PCT Pub. No.: WO2016/136995
PCT Pub. Date: Sep. 1, 2016

(65) Prior Publication Data
US 2018/0038416 A1 Feb. 8, 2018

(30) Foreign Application Priority Data
Feb. 27, 2015 (JP) .................................. 2015-039118

(51) Int. Cl.
*F16C 9/02* (2006.01)
*F16C 33/10* (2006.01)

(52) U.S. Cl.
CPC ............ *F16C 33/1065* (2013.01); *F16C 9/02* (2013.01)

(58) Field of Classification Search
CPC .................................. F16C 9/02; F16C 33/1065
See application file for complete search history.

(56) References Cited

U.S. PATENT DOCUMENTS

| | | | |
|---|---|---|---|
| 6,872,004 B2 | 3/2005 | Mian et al. | |
| 7,743,746 B2 | 6/2010 | Maier et al. | |

(Continued)

FOREIGN PATENT DOCUMENTS

| | | |
|---|---|---|
| JP | 2003532036 A | 10/2003 |
| JP | 2008523325 A | 7/2008 |

(Continued)

OTHER PUBLICATIONS

International Preliminary Report on Patentability for International Application No. PCT/JP2016/055950; International Filing Date Feb. 26, 2016; dated Jul. 10, 2017; 9 pages—English Translation.
International Preliminary Report on Patentability for International Application No. PCT/JP2016/055950; International Filing Date Feb. 26, 2016; dated Jul. 10, 2017; 17 pages—Non English Translation.

(Continued)

*Primary Examiner* — Thomas R Hannon
(74) *Attorney, Agent, or Firm* — Cantor Colburn LLP

(57) ABSTRACT

A sliding bearing may include vertically-arranged half members obtained by halving a cylinder, wherein a narrow groove is provided circumferentially to both axial direction ends of a lower half member at a downstream side of a rotational direction. A peripheral section may be formed on a surface on an outer side of the narrow groove. The peripheral section may be formed to have a height from an outer peripheral surface of the half member that is shorter than a height of a contact surface from an outer peripheral surface of the half member. An inclined part that is inclined toward an inner peripheral side is provided to a downstream side end, of the narrow groove, and a coating layer is provided to an inner peripheral surface of the half member only part of an inner peripheral surface of the narrow groove including an inner peripheral surface of the inclined part.

5 Claims, 4 Drawing Sheets

(56) References Cited

U.S. PATENT DOCUMENTS

| | | | |
|---|---|---|---|
| 8,783,954 B2 | 7/2014 | Garnier | |
| 8,979,378 B2* | 3/2015 | Hikita | F16C 9/02 384/288 |
| 9,657,769 B2* | 5/2017 | Ashihara | F16C 9/02 |
| 9,726,223 B2 | 8/2017 | Kemnitz et al. | |
| 2004/0062458 A1* | 4/2004 | Mian | F16C 9/02 384/294 |
| 2008/0283021 A1 | 11/2008 | Maier et al. | |
| 2009/0078080 A1 | 3/2009 | Kemnitz et al. | |
| 2013/0108195 A1* | 5/2013 | Sun | F16C 17/12 384/26 |
| 2013/0209013 A1* | 8/2013 | Beaurepaire | F16C 9/04 384/276 |
| 2013/0343682 A1 | 12/2013 | Garnier | |
| 2014/0233875 A1 | 8/2014 | Kobayakawa et al. | |
| 2014/0242277 A1 | 8/2014 | Kemnitz et al. | |
| 2016/0102707 A1 | 4/2016 | Ashihara et al. | |

FOREIGN PATENT DOCUMENTS

| | | |
|---|---|---|
| JP | 2009520926 A | 5/2009 |
| JP | 2012047276 A | 3/2012 |
| JP | 2013072535 A | 4/2013 |
| JP | 2014031871 A | 2/2014 |
| JP | 2014508258 A | 4/2014 |
| JP | 2014126069 A | 7/2014 |
| JP | 2014224601 A | 12/2014 |

OTHER PUBLICATIONS

International Search Report for corresponding Application No. PCT/JP2016/055950; dated May 17, 2016.
Korean Intellectual Property Office (KIPO) Notification of Reason for Refusal corresponding to Application No. 10-2017-7027289; dated Dec. 26, 2017.

* cited by examiner

90°

SLIDING BEARING

CROSS REFERENCE TO RELATED APPLICATIONS

This is the U.S. national stage of application No. PCT/JP2016/55950, filed on Feb. 26, 2016. Priority under 35 U.S.C. § 119(a) and 35 U.S.C. § 365(b) is claimed from Japanese Application No. 2015-039118, filed on Feb. 27, 2015, the disclosures of which are also incorporated herein by reference.

TECHNICAL FIELD

The present invention relates to a technique of a sliding bearing, and to a technique of a sliding bearing including vertically-arranged half members obtained by halving a cylinder in parallel with an axial direction of the cylinder.

BACKGROUND ART

Conventionally known sliding bearings, for supporting a crankshaft of an engine, having a split structure in which two members obtained by halving a cylindrical member are combined are plagued by a large friction due to high viscosity of oil during a cold engine operation. Thus, one known bearing has relief portions (narrow grooves) formed over the entire circumference in both axial direction ends of the bearing (for example, see Patent Literature 1).

CITATION LIST

Patent Literature

PTL 1: Japanese Translation of PCT International Application Publication No. JP-T-2003-532036

SUMMARY OF INVENTION

Technical Problem

Such a bearing in which the narrow grooves are formed fails to achieve both a larger quantity of lead-in oil and a smaller quantity of outflow oil flowing through both axial direction ends. Thus, a further friction reducing effect has been unable to be expected.

Thus, the present invention is made in view of the problem described above, and provides a sliding bearing with which it is possible to suppress the total quantity of outflow oil and to obtain a further friction reducing effect.

Solution to Problem

The problem of the present invention is as described above. Next, a solution to the problem is described.

The present invention is a sliding bearing including vertically-arranged half members obtained by halving a cylinder in parallel with an axial direction of the cylinder. A narrow groove is provided circumferentially to an axial direction end of the lower half member at a downstream side of a rotational direction.

A peripheral section is formed on a surface on an outer side of the narrow groove in the axial direction.

The peripheral section is formed to have a height from an outer peripheral surface of the half member that is shorter than a height of a contact surface from an outer peripheral surface of the half member.

An inclined part that is inclined toward an inner peripheral side when approaching the downstream side is provided to a downstream side end, in the rotational direction, of the narrow groove. A coating layer is provided to at least part of an inner peripheral surface of the inclined part.

In the present invention, an inclined part that is inclined toward an inner peripheral side when approaching an upstream side may be provided to an upstream side end, in the rotational direction, of the narrow groove. A coating layer may be provided to at least part of an inner peripheral surface of the inclined part.

In the present invention, an inclined part that is inclined toward an inner peripheral side when approaching a peripheral end of the peripheral section may be provided to the peripheral end of the peripheral section, and the coating layer may be provided to part of the peripheral section including an inner peripheral surface of the inclined part.

In the present invention, the coating layer may include at least one of molybdenum disulfide, graphite, carbon, polytetrafluoroethylene, boron nitride, tungsten disulfide, and fluorine based resin.

Advantageous Effects of Invention

The present invention provides the following advantageous effects.

The narrow groove is provided without hindering generation of oil film pressure, whereby a friction reducing effect can be obtained with a smaller sliding area and the total quantity of outflow oil can be reduced. The inclined parts are provided to the downstream side end and the upstream side end, in the rotational direction, of the narrow groove, and the coating layer is provided to the inner peripheral surface of the inclined parts. Thus, foreign objects accumulated in a downstream side end and an upstream side end of the narrow groove in a rotational direction can be captured by the coating layer, whereby a surface of a shaft and an inner peripheral surface of the sliding bearing can be prevented from being damaged (seized or scratched) by the foreign objects.

DESCRIPTION OF EMBODIMENTS

Figure 1:
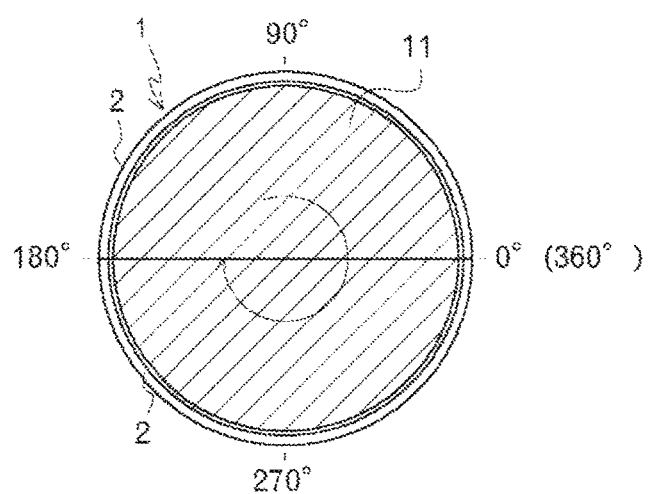
FIG. 1 is a front view of a sliding bearing according to an embodiment of the present invention.

Embodiments of the invention are described below. FIG. 1 is a front view of a sliding bearing 1, with a vertical direction of the sheet defined as an upper and lower direction, and a direction between a closer side and a farther side of the sheet defined as an axial direction (front and rear direction).

First of all, half members 2 as parts of the sliding bearing 1 according to an embodiment of the present invention are described with reference to FIG. 1 and FIG. 2A-2C.

The sliding bearing 1 is a cylindrical member, and is applied to a sliding bearing structure of a crankshaft 11 of an engine as illustrated in FIG. 1. The sliding bearing 1 includes two half members 2 and 2. The two half members 2 and 2 have shapes formed by halving a cylinder in parallel with the axial direction of the cylinder, and each have a semicircular cross-sectional shape. In the present embodiment, the half members 2 and 2 are arranged in the upper and lower direction with joining surfaces provided on left and right sides. When the sliding bearing 1 is supporting the crankshaft 11, a predetermined gap is formed, and lubricant oil is supplied into the gap through an unillustrated oil path.

Figure 2A:
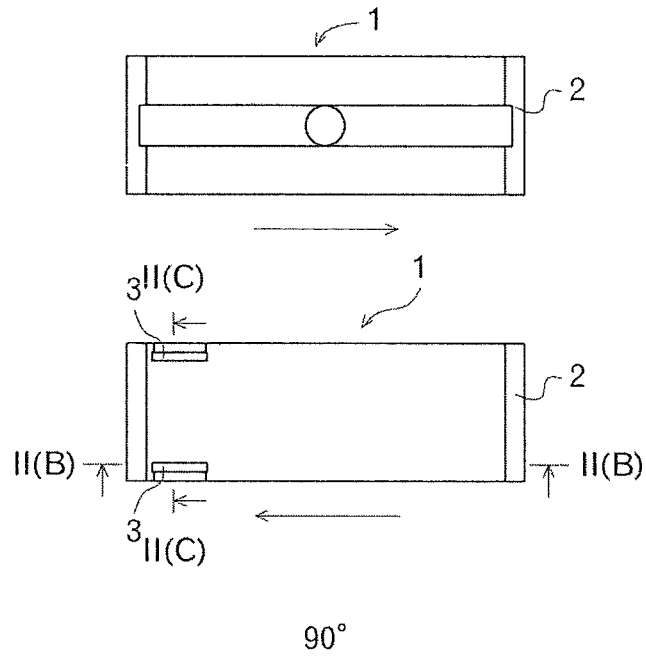
FIG. 2A is a plan view of a half member as part of the sliding bearing according to the embodiment of the present invention.
Figure 2B:
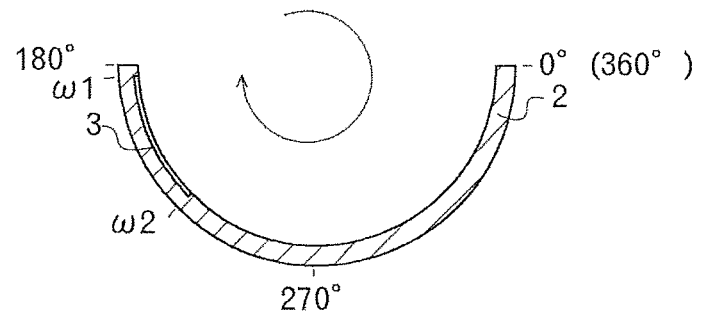
FIG. 2B is a cross-sectional view of the same taken along line II(B)-II(B)

FIG. 2A illustrates the half members 2 on upper and lower sides. In the present embodiment, a rotational direction of the crankshaft 11 corresponds to the clockwise direction in front view as indicated by an arrow in FIG. 1. A bearing angle ω is 0° at a right end position in FIG. 2B, and increases along the counterclockwise direction in FIG. 2B. More specifically, the bearing angle ω in FIG. 2B is defined as 180° at a left end position, and as 270° at a lower end position.

The half member 2 on the upper side has an inner circumference provided circumferentially with a groove that has a round hole at the center, and has the joining surfaces on the left and the right sides.

Figure 2C:
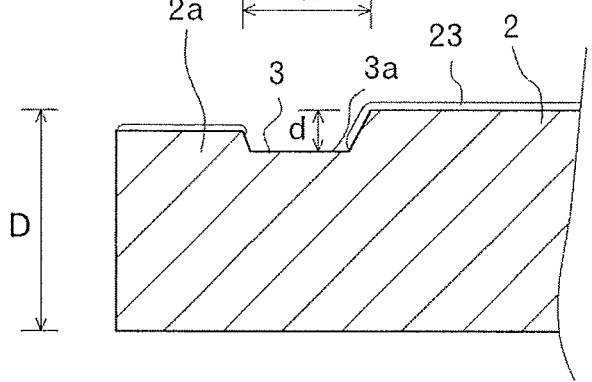
FIG. 2C is a cross-sectional view of the same taken along line II(C)-II(C).

The lower half member 2 has an inner circumference with axial direction ends provided with narrow grooves 3. A coating layer 23 is provided to an inner peripheral surface of the lower half member 2 as illustrated in FIG. 2C.

The coating layer 23 includes at least one of molybdenum disulfide, graphite, carbon, polytetrafluoroethylene, boron nitride, tungsten disulfide, and fluorine-based resin.

A peripheral section 2a is formed on a surface on the outer side of each of the narrow grooves 3 in the axial direction, and is formed to have a height h from an outer peripheral surface of the half member 2 that is shorter than a height D of a contact surface from the outer peripheral surface of the half member 2. Thus, the peripheral section 2a formed outward in the axial direction is formed to be one step lower than the contact surface, adjacent to the peripheral section 2a, to be in contact with the crankshaft 11.

The narrow grooves 3 are described with reference to FIG. 2B and FIG. 2C.

The narrow grooves 3 are provided on the lower half member 2. In the present embodiment, two narrow grooves 3 are arranged in parallel in the axial direction. More specifically, the narrow grooves 3 extend circumferentially to a bearing angle ω2 in a direction in which the bearing angle ω increases (counterclockwise direction) from a position (with the bearing angle ω of ω1) separated from the joining surface (with the bearing angle ω of 180°) at a downstream side of a rotational direction of the crankshaft 11. The lower half member 2 has a joining surface on the right side in FIG. 2B as a joining surface at an upstream side of the rotational direction, and a joining surface on the left side in FIG. 2B as the joining surface at the downstream side of the rotational direction.

The narrow grooves 3 are formed to have a width was illustrated in FIG. 2C

The narrow grooves 3 are also formed to have a depth d shorter than the height D of the contact surface from the outer peripheral surface of the half member 2. The depth d to a bottom surface 3a of the narrow groove 3 changes from one end of the narrow groove 3 in the longitudinal direction toward the other end as illustrated in FIG. 3A.

Figure 3A:
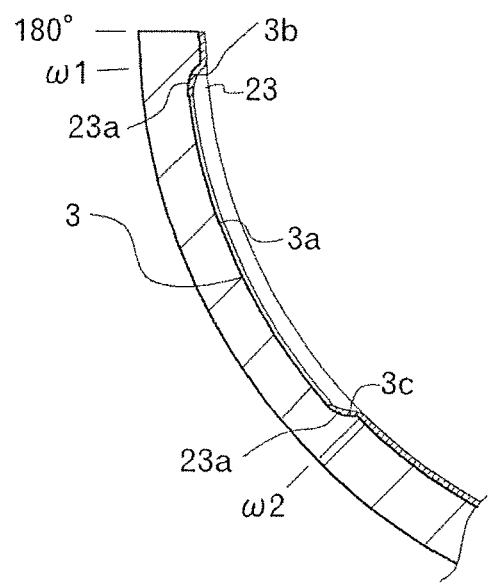
FIG. 3A is an enlarged cross-sectional view of a narrow groove according to the embodiment of the present invention taken along line II(B)-II(B)
Figure 3B:
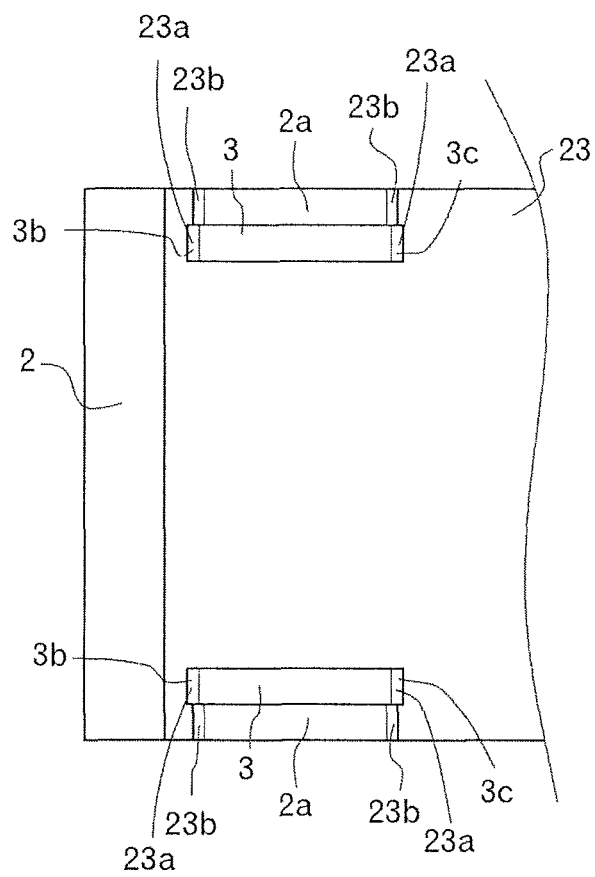
FIG. 3B is an enlarged plan view of the narrow groove.

As illustrated in FIG. 2B and FIG. 3A-3B, an inclined part 3b is provided to a downstream side end, in the rotational direction, of each of the narrow grooves 3. The inclined part 3b is inclined toward an inner peripheral side when approaching the downstream side, and has a curved shape that is more sharply inclined at a portion more on the downstream side as viewed in a cross-sectional view (cross-sectional view taken along the line II(B)-II(B)) in parallel with the longitudinal direction.

An inclined part 3c is provided to an upstream side end, in the rotational direction, of each of the narrow grooves 3. The inclined part 3c is inclined toward an inner peripheral side when approaching the downstream side, and has a curved shape that is more sharply inclined at a portion more on the upstream side as viewed in the cross-sectional view (cross-sectional view taken along the line II(B)-II(B)) in parallel with the longitudinal direction.

As illustrated in FIG. 3A and FIG. 3B, coating layers 23a and 23a are provided to at least part of inner peripheral surfaces of the inclined part 3b and the inclined part 3c.

The coating layer 23 includes molybdenum disulfide, graphite, carbon, polytetrafluoroethylene, boron nitride, tungsten disulfide, or fluorine-based resin. The coating layer 23 with this configuration has lipophilicity.

Foreign objects such as dust that has entered between the crankshaft 11 and the inner peripheral surface might enter into the narrow groove 3. The foreign objects that have thus entered are likely to be accumulated on the inclined part 3b or the inclined part 3c. The coating layers 23a and 23a, provided on the inner peripheral surfaces of the inclined part 3b and the inclined part 3c, have low hardness. Thus, the foreign objects such as dust can be buried and captured in the coating layers 23a and 23a. A larger amount of foreign objects is likely to accumulate on the inclined part 3b than on the inclined part 3c. Thus, the coating layer 23a may be provided only on the inclined part 3b. With this configuration, a surface of the crankshaft 11 and the inner peripheral surface of the sliding bearing 1 can be prevented from being damaged (seized or scratched) by the foreign objects.

With the peripheral section 2a formed to be one step lower than the contact surface, adjacent to the peripheral section 2a, to be in contact with the crankshaft 11, the peripheral section 2a is less likely to be in contact with the crankshaft 11 inclined to be in a state of being in contact with one axial direction end (partial contact state), and thus can be prevented from being damaged.

The peripheral section 2a is formed to be one step below the contact surface adjacent to the peripheral section 2a. Thus, a larger gap is achieved in the end portion of the sliding bearing 1 in the axial direction. Thus, the quantity of lead-in oil is increased and the total quantity of outflow oil is reduced.

Coating layers 23b and 23b are provided on the upstream side end and the downstream side end of the peripheral section 2a in the inner peripheral surface.

The coating layers 23b and 23b, provided on the inner peripheral surfaces of the peripheral section 2a, have low hardness. Thus, the foreign objects such as dust can be buried and captured in the coating layers 23b and 23b. With this configuration, the surface of the crankshaft 11 and the inner peripheral surface of the sliding bearing 1 can be prevented from being damaged by the foreign objects.

With the narrow grooves 3 according to the present embodiment, a smaller FMEP is achieved. An especially smaller FMEP is achieved in a region with a low engine speed. The FMEP is a value indicating friction characteristics. Smaller FMEP leads to a lower friction. For example, at the timing of engine cold start, FMEP is reduced and the friction is reduced.

The coating layers 23 are formed by being applied on the inner peripheral surfaces of the half members 2. The coating layer 23 is formed to cover the inner side end in the axial direction as illustrated in FIG. 3A. More specifically, the coating layer 23 is applied in an area between an end and an intermediate portion of a side surface of the narrow groove 3 on the inner side in the axial direction. This configuration where the coating layer 23 covers the inner side end of the narrow groove 3 in the axial direction can achieve a smaller friction between the inner side end of the narrow groove 3 in the axial direction and the crank shaft 11 when the crankshaft 11 is inclined to be in a state of being in contact with one end in the axial direction (partial contact state).

Figure 4:
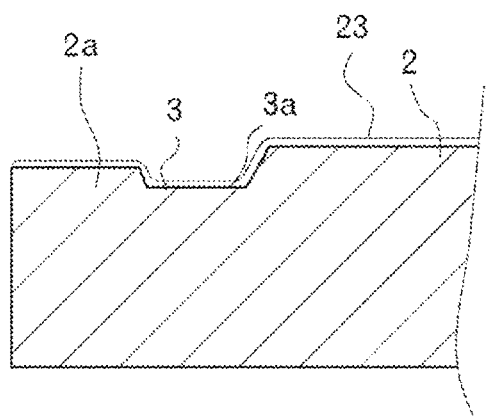
FIG. 4 is a cross-sectional view of a half member according to another embodiment of the present invention taken along line II(C)-II(C).

The coating layer 23 may be formed to entirely cover the narrow groove 3 as illustrated in FIG. 4. This configuration can achieve a smaller friction between the inner side end of the narrow groove 3 in the axial direction and the crank shaft 11 when the crankshaft 11 is inclined to be in a state of being in contact with one end in the axial direction (partial contact state).

As described above, the sliding bearing 1 includes vertically-arranged half members 2 and 2 obtained by halving a cylinder in parallel with the axial direction of the cylinder. The narrow groove 3 is provided circumferentially to the axial direction end of the lower half member 2 at the downstream side of the rotational direction. The inclined part 3b, which is inclined toward the inner peripheral side when approaching the downstream side, is provided to the downstream side end, in the rotational direction, of the narrow groove 3. The coating layer 23a is provided to at least part of the inner peripheral surface of the inclined part 3b.

With this configuration, the narrow groove 3 is provided without hindering generation of oil film pressure, whereby a friction reducing effect can be obtained with a smaller sliding area and the total quantity of outflow oil can be reduced. The inclined part 3b is provided to the downstream side end, in the rotational direction, of the narrow groove 3, and the coating layer 23a is provided to the inner peripheral surface of the inclined part 3b. Thus, the foreign objects accumulated on the downstream side end of the narrow groove 3 in the rotational direction are captured by coating layer 23a. Thus, the surface of the crank shaft 11 and the inner peripheral surface of the sliding bearing 1 can be prevented from being damaged by the foreign objects.

The inclined part 3c, which is inclined toward the inner peripheral side when approaching an upstream side, is provided to the upstream side end, in the rotational direction, of the narrow groove 3. The coating layer 23a is provided to at least part of the inner peripheral surface of the inclined part 3c.

With this configuration, the foreign objects accumulated on the upstream side end of the narrow groove 3 in the rotational direction are captured by coating layer 23a. Thus, the surface of the crank shaft 11 and the inner peripheral surface of the sliding bearing 1 can be prevented from being damaged by the foreign objects.

The coating layer 23 includes at least one of molybdenum disulfide, graphite, carbon, polytetrafluoroethylene, boron nitride, tungsten disulfide, and fluorine-based resin.

This configuration can achieve higher conformability with respect to lubricant oil, whereby the quantity of the outflow oil can be reduced. Thus, the total quantity of the outflow oil can be reduced. The coating layer 23a provided to the inclined part 3b of the downstream side end and the inclined part 3c of the upstream side end in the narrow groove 3 includes at least one of molybdenum disulfide, graphite, carbon, polytetrafluoroethylene, boron nitride, tungsten disulfide, and fluorine-based resin. Thus, low hardness facilitating the capturing of the foreign objects such as dust can be achieved.

INDUSTRIAL APPLICABILITY

The present invention can be applied to a technique for a sliding bearing, and can be applied to a technique for a sliding bearing including vertically-arranged half members obtained by halving a cylinder in parallel with an axial direction of the cylinder.

REFERENCE SIGNS LIST

1 Sliding bearing
2 Half member
2a Peripheral section
3 Narrow groove
3a Bottom surface
3b Inclined part
3c Inclined part
 11 Crankshaft
 23, 23a Coating layer

The invention claimed is:

1. A sliding bearing comprising:
vertically-arranged half members obtained by halving a cylinder in parallel with an axial direction of the cylinder, wherein a narrow groove is provided circumferentially to both axial direction ends of a lower half member at a downstream side of a rotational direction,
a peripheral section is formed on a surface on an outer side of the narrow groove in the axial direction,
the peripheral section is formed to have a height from an outer peripheral surface of the half member that is shorter than a height of a contact surface from an outer peripheral surface of the half member,
an inclined part that is inclined toward an inner peripheral side when approaching the downstream side is provided to a downstream side end, in the rotational direction, of the narrow groove, and a coating layer is provided to an inner peripheral surface of the half member and is provided to only part of an inner peripheral surface of the narrow groove including an inner peripheral surface of the inclined part.

2. The sliding bearing according to claim 1, wherein an inclined part that is inclined toward an inner peripheral side when approaching an upstream side is provided to an upstream side end, in the rotational direction, of the narrow groove, and the coating layer is provided to only part of the inner peripheral surface of the narrow groove including an inner peripheral surface of the inclined part.

3. The sliding bearing according to claim 2, wherein the coating layer is provided to part of the peripheral section.

4. The sliding bearing according to claim 1, wherein the coating layer is provided to part of the peripheral section.

5. The sliding bearing according to claim 1, wherein the coating layer includes at least one of molybdenum disulfide, graphite, carbon, polytetrafluoroethylene, boron nitride, tungsten disulfide, and fluorine-based resin.

* * * * *